United States Patent
Braga et al.

(10) Patent No.: US 9,936,726 B2
(45) Date of Patent: Apr. 10, 2018

(54) FOOD-GRADE ENCAPSULATE AND PROCESS FOR THE PRODUCTION THEREOF

(75) Inventors: Ana Luiza Braga, Paraiba (BR); Eric Kolodziejczyk, Vevey (CH); Christophe Joseph Etienne Schmitt, Lausanne (CH)

(73) Assignee: Nextec S.A., Vevey (CH)

( * ) Notice: Subject to any disclaimer, the term of this patent is extended or adjusted under 35 U.S.C. 154(b) by 0 days.

(21) Appl. No.: 14/233,060

(22) PCT Filed: Jul. 13, 2012

(86) PCT No.: PCT/EP2012/063855
§ 371 (c)(1),
(2), (4) Date: Jan. 15, 2014

(87) PCT Pub. No.: WO2013/010966
PCT Pub. Date: Jan. 24, 2013

(65) Prior Publication Data
US 2014/0161939 A1 Jun. 12, 2014

(30) Foreign Application Priority Data

Jul. 15, 2011 (EP) .................................. 11174258

(51) Int. Cl.
| | | |
|---|---|---|
| *A23G 3/20* | (2006.01) | |
| *A23P 10/30* | (2016.01) | |
| *B01J 13/00* | (2006.01) | |
| *C08J 3/12* | (2006.01) | |
| *C08L 5/00* | (2006.01) | |
| *C08L 89/00* | (2006.01) | |
| *A23L 29/20* | (2016.01) | |
| *A23L 33/16* | (2016.01) | |
| *A23L 33/17* | (2016.01) | |

(52) U.S. Cl.
CPC ............... *A23P 10/30* (2016.08); *A23L 29/20* (2016.08); *A23L 33/16* (2016.08); *A23L 33/17* (2016.08); *B01J 13/0065* (2013.01); *C08J 3/126* (2013.01); *C08L 5/00* (2013.01); *C08L 89/00* (2013.01); *C08L 89/005* (2013.01); *A23V 2002/00* (2013.01); *C08J 2305/06* (2013.01); *C08J 2389/00* (2013.01)

(58) Field of Classification Search
USPC .................................................. 426/103, 573
See application file for complete search history.

(56) References Cited

U.S. PATENT DOCUMENTS 3,899,598 A * 8/1975 Fischer ............... A23L 1/22066
426/311
5,418,010 A * 5/1995 Janda .................... A61K 9/1658
264/4.1
6,221,419 B1 * 4/2001 Gerrish .................. A23C 9/137
426/50

(Continued)

FOREIGN PATENT DOCUMENTS

WO WO2007073188 * 6/2007
WO WO 2009108074 A1 * 9/2009

*Primary Examiner* — Katherine D Leblanc
(74) *Attorney, Agent, or Firm* — K&L Gates LLP

(57) ABSTRACT

A food-grade encapsulate which comprises gelled proteins associated with a micronutrient, preferably a dietary mineral, as well as a process for producing the encapsulates are disclosed, with low micronutrient leakage during storage.

14 Claims, 4 Drawing Sheets

A

B

(56) References Cited

U.S. PATENT DOCUMENTS

6,444,252 B1 * 9/2002 Gordon et al. ............... 426/573
2005/0244543 A1 * 11/2005 Takaichi ................. A23L 1/304
426/74

* cited by examiner

FOOD-GRADE ENCAPSULATE AND PROCESS FOR THE PRODUCTION THEREOF

CROSS REFERENCE TO RELATED APPLICATIONS

The present application is a National Stage of International Application No. PCT/EP2012/063855, filed on Jul. 13, 2012, which claims priority to European Patent Application No. 11174258.1, filed Jul. 15, 2011, the entire contents of which are being incorporated herein by reference.

TECHNICAL FIELD

The invention relates to a food-grade encapsulates which comprises gelled proteins associated with a micronutrient. A process for producing the encapsulate is also disclosed.

BACKGROUND OF THE INVENTION

Fortification of food with micronutrients such as iron is not a straightforward procedure. For instance iron induces very often unacceptable product alterations related to its discoloring and pro-oxidative properties. To avoid these alterations it is common to use insoluble iron sources, which are less chemically reactive than water soluble iron salts. However, these compounds generally have a reduced bioavailability, and hence lower nutritional value. It is clear though that bioavailability depends on many factors, such as food matrix and population age.

Another solution is encapsulation of iron, in order to physically prevent iron from interacting with other food ingredients. The iron compound is coated with a protective layer or embedded in a matrix, which constitutes a physical barrier to its diffusion or dissolution in the food matrix, reducing its reactivity. The release of iron is then triggered by pH, enzymatic cleavage or temperature changes.

Fat based encapsulates are not heat stable and they undergo phase separation in aqueous compositions. However, an advantage of such systems is the possibility to encapsulate iron sulphate, which is considered as the most bioavailable iron compound, and thus used as a reference for bioavailability comparisons. Other types of encapsulates are based on phospholipids and most of them deliver iron pyrophosphate, which is less bioavailable than iron sulphate.

Proteins like lactoferrins can chelate iron. However, such proteins impart an undesirable pink colour to the product. The high affinity for iron is also a characteristic of other proteins such as caseins or globular proteins. Remondetto et al. (2004) (Journal of Agricultural and Food Chemistry, 52, 8137-8143) has studied the iron release mechanism of globular proteins macrogels containing iron gelled by means of heat and ionic induction.

Surh et al. (2007) (Journal of Agricultural and Food Chemistry, 55, 175-184) describes water-in-oil emulsification processes. However, the drawback of applying water-in-oil emulsification process is the additional step needed to separate the microparticles and wash-out the oil.

It is also desirable to offer an iron encapsulate which does not imply the declaration of multiple ingredients. No such encapsulates exist today that can offer satisfactory performance in high moisture applications. From the numerous iron encapsulation systems from suppliers that were evaluated so far, Ferrazone (iron-EDTA) appears to be the best solution. However EDTA is not allowed in all countries.

Similar difficulties are encountered when other micronutrients are considered.

Therefore, it is desirable to offer a versatile fortification solution, which is adapted to several micronutrients.

SUMMARY OF THE INVENTION

Therefore, there is a need for a food-grade encapsulate that exhibits some, preferably all, of the following properties: stability under heat treatment, stability in several food matrices, especially high moisture matrices, stability during storage, protection of the food matrix against alterations associated with micronutrients fortification, or mitigation of the undesirable effects of such fortification. Production of such a micronutrient encapsulate should be reliably reproducible at an industrial scale, in a cost effective manner. Moreover, the encapsulate should be versatile, meaning that it can be adapted easily to several micronutrients.

It is an object of embodiments of the invention to fulfil the need for a food-grade encapsulate having the properties mentioned above. This object is solved by means of invention defined in the independent claims. The dependent claims further develop the central idea of the invention.

In a first aspect, the invention relates to a food-grade encapsulate comprising gelled protein aggregates embedded in a continuous polysaccharide phase, wherein said gelled protein aggregates comprise a micronutrient, and wherein the encapsulate exhibit a size of from 1 micron to 5 mm. Preferably, said micronutrient is a dietary mineral, or a mixture of several dietary minerals.

In embodiments of the invention, the proteins are selected from globular proteins, preferably from whey proteins, soy proteins, egg white proteins, pea proteins, lupin proteins, potato proteins, canola proteins, or mixtures thereof. In other embodiments, said proteins are micellar casein, acid caseins, caseinates, or mixtures thereof.

In embodiments of the invention, the polysaccharide component is selected from highly branched pectins, arabinogalactans, arabinogalactan-protein complexes, cereal arabinoxylans, high molecular weight polysaccharides and/or gelling polysaccharides, preferably selected from alginate, carrageenans, pectins, agar, guar gum, locust bean gum, or xanthan gum, or mixtures thereof. Preferably, the polysaccharide component is selected from high molecular weight polysaccharides and/or gelling polysaccharides, preferably selected from alginate, carrageenans, pectins, agar, guar gum, locust bean gum, or xanthan gum.

In embodiments of the invention, the encapsulate has a pH ranging from 1.5 units above or below the isoelectric point of the protein.

In a second aspect, the invention relates to a process for producing a food-grade encapsulate, comprising the steps of:
a) mixing a micronutrient with a protein solution, where the micronutrient is provided as a salt or a solution,
b) gelling said protein solution,
c) before or after step b), adding a polysaccharide component to the protein solution.

In embodiments of the invention, the protein solution has a concentration of 1 to 10% by weight of protein, and step b) can comprise:
heating the protein solution to a temperature from 70° C. to 150° C., for a period of from 10 seconds to 2 hours, at a pH from 5.8 to 8.0, until gelation of said protein,
adjusting the pH of the protein solution to the isoelectric point of said protein treating the protein solution under high-pressure from 200 MPa to 800 MPa at a temperature from 20° C. to 100° C., for a period of from 10 seconds to 2 hours, at a pH from 5.8 to 8.0, until gelation of said protein.

A third aspect of the invention is a food product which comprises a food-grade encapsulate according to the first aspect of the invention, or produced by a process according to the second aspect of the invention. Food products include beverages and solid food. A food-grade encapsulate which is in the form of a powder, is also part of the invention. Such an encapsulate may be used for fortification of food and beverage products.

These and other aspects, features and advantages of the invention will become apparent to those skilled in the art upon reading the disclosure provided here in connection with the attached drawings. The detailed description, while indicating preferred embodiments of the invention, is only given by way of illustration of the invention.

DETAILED DESCRIPTION OF THE INVENTION

Micronutrient Component

Several micronutrients can be considered for encapsulation. As already mentioned, the micronutrients preferably are dietary mineral, or mixes of dietary mineral. The dietary minerals are provided as food-grade mineral or organic salts, or ions. Examples of dietary minerals include:

potassium, calcium, and magnesium, and trace elements, such as iron, boron, cobalt, chromium, copper, fluorine, iodine, manganese, molybdenum, selenium, and zinc.

Dietary mineral mixes of particular interest comprise iron. In addition, they can also comprise zinc or iodine. Iron, zinc and iodine mixes are also of interest. In an embodiment, iron components can be considered as micronutrients for encapsulation. Preferably, the iron component is selected from the group consisting of $Fe^{2+}$, $Fe^{3+}$, and mixtures thereof. Iron components are provided as salts or in the form of a solution of such salts. Salts can be inorganic salts or organic salts. Inorganic salts include chloride, phosphate, pyrophosphate and sulphate. Other foodgrade inorganic salts could be considered. Organic salts include fumarate, lactate, citrate, gluconate, succinate, saccharate, glycerophosphate and tartrate. For instance, iron sulphate, ferric pyrophosphate are used. Such products are commodities in the food industry.

Encapsulates

According to the invention, micronutrients encapsulates are prepared by a microencapsulation process, to obtain encapsulates. Such processes are described for instance in an article by Sagalowicz and Leser "Delivery systems for liquid food products" (Current Opinion in Colloid & Interface Science 15 (2010) 61-72). Another reference that discusses microencapsulation processes is the book edited by Zuidam and Nedovic "Encapsulation Technologies for Active Food Ingredients and Food Processing" (2008). Upon microencapsulation, the micronutrient component is embedded in a gelled protein matrix. In other words, a gel is obtained on a sub-micronic, micrometer or millimiter scale, which forms a stable colloidal dispersion of gelled protein, and micronutrient component. Preferably, the micronutrient component comprises iron. Depending on which type of protein is used, different species of encapsulates may be obtained, such as discrete gel microparticles and molecular complexes, wherein the protein matrix is gelled In the frame of this invention, gelled proteins are defined as an assembly of 100 to thousands of monomeric protein units forming a 3-dimensional network enable to retain solvent, mostly water. In this assembly, protein monomers are generally not in their native state and are held together by non-covalent (electrostatic, hydrophobic and/or hydrogen bonds) and/or covalent bonds. All physicochemical features describing protein gels are detailed in the review paper by Clark and Ross-Murphy "Structural and mechanical properties of biopolymer gels" (Advances in Polymer Science, 83, 57-192). For instance, gelled proteins can be obtained by heat treatment of globular proteins above their denaturation temperature leading to aggregation and gelation. Alternatively, gelled proteins can be formed by aggregation and gelation of proteins close to their isoelectrical pH.

The encapsulates also comprise a polysaccharide component, which improves the stability of the gelled protein matrix and micronutrient component within the gelled protein matrix.

The size and structure of the encapsulates depend mainly on the nature of the proteins used to prepare the encapsulates, the method of preparation, as well as the polysaccharide component.

The production of iron encapsulates will now be described in greater details. The process described below can be adapted readily to other dietary minerals such as potassium, calcium, magnesium, and trace elements mentioned above.

Gel Microparticles Iron Encapsulates

The iron encapsulates consist of gelled protein microparticles grouped together in a gelled polysaccharide matrix. The iron encapsulates are discrete particles with a mean diameter ranging from 20 to 5000 microns. The gelled protein microparticles have a mean diameter ranging from about 200 nm to about 20 microns. The mean diameter of the iron encapsulates can be measured by diffusion light scattering using for example a Malvern MasterSizer 2000 (laser diffraction unit, with a size range from 0.02 to 2000 microns) equipped with a Malvern Hydro 2000G (large sample dispersion unit), a Honeywell water pressure reducer (maximum deionised water pressure: 1 bar) and a ERMA water degasser (to reduce the dissolved air in the deionised water). The measurements are calculated in the Malvern software based on the Mie theory. The following parameters are used to measure the size distribution of the gel microparticle encapsulates: 1.460 for the refraction index of the particles, 0.01 for the particles absorption, the dispersant used is water with a refraction index of 1.330.

In a first embodiment of the invention, gel microparticle encapsulates are produced with caseins or globular proteins as a protein source. Caseins include micellar casein, caseins, caseinates, or mixtures thereof. At least two methods can be proposed for manufacturing gel microparticles iron encapsulates: a drip method and an extrusion method.

In a first variant of the first embodiment, a casein solution is first prepared, preferably having a concentration from 1 to 10% by weight of casein. More preferably, the casein concentration ranges from 6 to 9% by weight. An iron solution is then admixed to the casein solution, under stirring. The iron component has been described above. Preferably, the solution comprises sodium citrate and sodium ascorbate if iron sulphate is used. Preferably, iron is in the ferrous form. Preferably, the iron solution is at a pH from 6 to 7.

A solution comprising gelling high molecular weight polysaccharides is then admixed to the casein and iron solution, still under stirring. Preferably, said polysaccharides are selected from alginate, carrageenans, pectins, or agar.

Preferably, the total content of biopolymer (polysaccharides and protein) and the ratio between protein and polysaccharides should be such that the mixture falls into an incompatible (2-phase) region of a phase diagram. The incompatible region of the phase diagram can be determined by optical microscopy. This determination can be done as follows: a mixture of protein and polysaccharide solution is stained with rhodamine, then put on glass slides and covered with cover slides. The sample is then observed under light excitation of 450-490 nm wavelength in a Leica DMR microscope coupled with a camera DC 300F. The images are taken using the 40× or the 10× objectives. All mixtures that show a dispersed and a continuous phase are considered as incompatible. For achieving a dispersed phase of protein, the phase volume of the protein should be below 50%.

For instance, when alginate is used as a polysaccharide, then the caseinate:alginate ratio can be 2:1 by weight. When whey protein (denatured) is used with alginate as a polysaccharide, then the whey:alginate ratio can be 4:1 by weight. When denatured whey protein and carrageenan are used the whey:carrageenan ratio can be 7:1 by weight.

Then, the pH of the casein and polysaccharide solution is adjusted to the isoelectric point of the casein (or a value up to 1 pH units above or below the isoelectric point of the protein). This can be performed by addition of an acidic solution, preferably progressively, until the isoelectric point is reached. This results in gelling of the casein. For instance, a 0.1 M citric acid solution can be used. It is also possible to acidify the solution by addition of glucono-delta-lactone powder.

Figure 1:
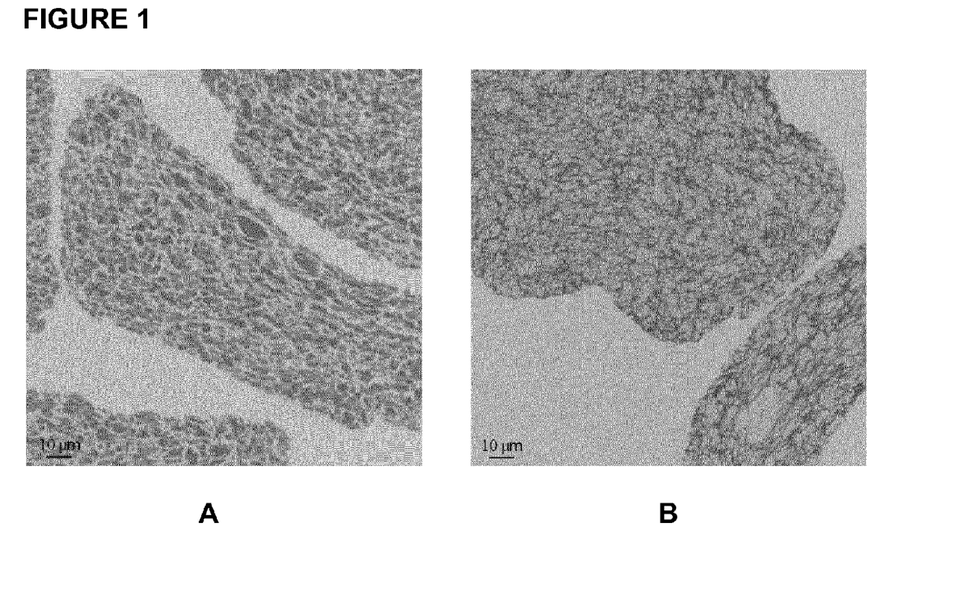
FIG. 1 shows gel microparticles encapsulates containing polysaccharides, prepared according to Example 1, by light microscopy. A: gelled protein dispersed phase; B: gelled polysaccharide continuous phase. Scale bar represents 10 microns.

As can be seen on FIG. 1, the gel microparticles are discrete structures that have a gelled protein dispersed phase in a gelled polysaccharide continuous phase.

In a second variant of the first embodiment, a globular protein solution is first prepared and the proteins are denatured using a heat treatment, as described in relation with the first embodiment. Then, a first solution containing polysaccharide is added to the globular protein solution. Details are similar to the first variant above. Then, the pH of the globular protein and polysaccharide solution is adjusted as described above in relation with the first variant.

The protein and polysaccharides acidified solution is then transferred into a second solution containing calcium, zinc or potassium cations or other ions that could gel a high molecular weight polysaccharide, by dripping or extruding. This acidified solution can also be spray-dried or spray-chilled. Preferably, when the polysaccharide is alginate, the second solution contains calcium or zinc cations. Preferably, when the polysaccharide is carrageenan, the second solution contains calcium or potassium cations. The drop break-up can be induced by cutting a solution jet, by jet vibration or by jet pressure. The size of the gelled particles will depend on the size of the nozzle, the rate of cutting, the vibration mode and/or pressure applied. Such process parameters can be selected by the skilled person. The counterions in the second solution can be a halide, such as chloride or iodide. Other foodgrade counterions can be used, such as lactate or gluconate. Preferably, the second solution is a calcium chloride solution with a concentration of 0.1 to 0.6 M of metal salts.

This process results in a suspension of gel microparticle encapsulates in a liquid medium. The microparticle encapsulates can be separated from the liquid medium, for instance by centrifugation or filtration.

Advantageously, the microparticle encapsulates are then dried. Different drying methods can be implemented, such as spray-drying or fluidized bed drying. This results in a powder comprising gelled microparticle encapsulates.

The gel microparticle encapsulates prepared according to the first embodiment are discrete particles. They can be used as visual cues in a final food product. They can be added to the final food product in the form of an aqueous product or of a dried product.

Molecular Complexes Encapsulates

Molecular complexes comprising protein microgels have a dimension of from 50 to 600 nm, preferably about 100 nm. The molecular complexes may be bridged together by a polysaccharide component, or gelatine to form molecular complexes encapsulates. The molecular complexes encapsulates may have a dimension of from 200 nm to 100 microns. The dimension of the molecular complexes encapsulates can be assessed by dynamic light scattering using for example a Zetasizer Nano ZS apparatus (Malvern Instruments, Ltd.) The apparatus is equipped with a He—Ne laser emitting at 633 nm and with a 4.0 mW power source. The instrument uses a backscattering configuration where detection is done at a scattering angle of 173° using an avalanche photodiode. The molecular complex encapsulates are diluted to less than 1.0 wt % in Millipore water and poured in squared plastic cuvettes (Sarstedt, Germany). Measurements are performed at 25° C. Depending on the sample turbidity, the pathlength of the light is set automatically by the apparatus. The autocorrelation function $G_2(t)$ is calculated from the fluctuation of the scattered intensity with time. From the polynomial fit of the logarithm of the correlation function using the "cumulants" method, the z-average hydrodynamic diameter of the particles is calculated assuming that the diffusing particles are monodisperse spheres.

When preparing molecular complexes encapsulates, globular proteins are preferably used as a protein source. Globular proteins include whey proteins, soy proteins, egg white proteins, pea proteins, lupin proteins, or mixtures thereof. As disclosed in relation with gel microparticle encapsulates, a globular protein solution is heat treated to denaturate the proteins. This results in gelling of the globular protein due to hydrophobic interactions and formation of covalent bonds. Usually, the protein solution has a concentration of 1 to 8% by weight of protein, preferably between 3 and 6% by weight.

In a second embodiment of the invention, the iron component is added to the protein solution before the heat treatment. The iron component is described in details above. Preferably, it is added as a salt in the dry state. It can also be added as a solution. Excess water is then removed, for instance by evaporation or microfiltration.

After the heat treatment, a polysaccharide component is added to the protein solution. The polysaccharide component is preferably highly branched pectins, arabinogalactans, arabinogalactan-protein complexes, cereal arabinoxylans, or mixtures thereof.

Molecular complexes encapsulates are obtained, as a dispersion in water.

Advantageously, the pH of the molecular complexes encapsulates dispersion can be adjusted between the values of 2.0 and 7.0, preferably between pH values of 4.0 and 5.0.

Advantageously, the molecular complexes encapsulates are then dried. Different drying methods can be implemented, such as spray-drying or freeze-drying. This results in a powder comprising iron encapsulates.

In a third embodiment of the invention, the iron component is added to the protein solution after the heat treatment. The iron component is described in details above. Preferably, it is added as a solution. After stirring, the polysaccharide component is added to the gelled proteins. The polysaccharide component is preferably highly branched pectins, arabinogalactans, arabinogalactan-protein complexes, cereal arabinoxylans, or mixtures thereof.

Advantageously, the pH of the molecular complexes dispersion can be adjusted between the values of 2.0 and 7.0, preferably between pH values of 4.0 and 5.0.

Advantageously, the molecular complexes encapsulates are then dried. Different drying methods can be implemented, such as spray-drying or freeze-drying. This results in a powder comprising iron encapsulates.

The iron encapsulate obtained according to the intention described above can be used for fortifying a food product with iron, or other dietary minerals, depending on the minerals used in the encapsulation process.

As mentioned above, the invention proposes a process for producing a food-grade encapsulate, comprising the steps of:
a) mixing a micronutrient with a protein solution,
b) gelling said protein solution,
c) before or after step b), adding a polysaccharide component to the protein solution.

Hence, several combinations of steps are encompassed within the context of the invention: a-b-c, and a-c-b. Each of these combinations can be followed by a drying step.

They can be added to a final food product, as an ingredient, in the form of an aqueous product or of a powder.

Similar processes can be used to prepare encapsulates that contain other species of dietary mineral. These encapsulates can be used to fortify a food product with dietary minerals. The encapsulates can be prepared in order to comprise a single species of dietary mineral, or several species dietary mineral. When it is desired to fortify a food product with dietary minerals, the required mix of encapsulates can be prepared from "single species encapsulates", or encapsulates with the desired mix of mineral micronutrients can be prepared.

Final food product include chilled dairy products (yoghurt, cream, desserts, mousse), ambient dairy products (condensed milk), frozen food products (ice cream, sorbet), confectionary products (sugar candies, marshmallows, jellies) and culinary (soups, bouillon) or beverages (ready to drink or powders for reconstitution in a liquid). Such final food products can contain either or both forms of food-grade encapsulate: gel microparticle encapsulates or molecular complexes encapsulates.

It should now be mentioned that the invention provides a food-grade dietary mineral encapsulate, especially an iron encapsulate, that fulfils the objectives set above. Indeed, as will be shown in the examples, the encapsulates exhibit a stable iron content, both during processing and during storage.

Hence, an embodiment of the invention is an iron encapsulate comprising molecular complexes which exhibit iron leakage of less than 30% at 20° C., for a storage time of 0.5 month, or of 1 month, or of 2 months, or of 5 months, in sweetened condensed milk and similar high sugar concentration food products.

EXAMPLES

The ingredients are of food-grade quality and can be supplied from Davisco Foods International, Dr. Paul Lohmann, C P Kelco, Emmi Schweiz A G, International Specialty Products Inc.

Example 1: Preparation of Microparticle Encapsulates with Sodium Caseinate and Polysaccharide Component Final composition of encapsulates (before drying): 3 wt % Na-caseinate/1.4 wt % Na-alginate/0.21 wt % Fe Description of the process:
1) Mix 37.5 g of 8 wt % Na-caseinate solution with 0.5 g of 1.2M $FeSO_4$/1.2 M Na-citrate/1.2M sodium ascorbate solution for 15 min.
2) Add 56 g of 2.5 wt % Na-alginate solution and stir for 15 min.
3) Add about 9 g of 0.1 M citric acid solution while stirring to reduce the pH to 5.0 for gelling the protein with iron. The decrease of pH is done gradually, which means that the mixture is stirred for 1 min at each decrease of 0.2 units pH.
4) Drip the mixture (pH 5.0) onto 8 wt % calcium chloride solution under stirring (keep under stirring for 30 min). The drop break-up can be induced by cutting a solution jet, by jet vibration or by jet pressure. The size of the gelled particles (20-5000 μm) will depend on the size of nozzle, rate of cutting, vibration mode and/or pressure applied.
5) Separate the encapsulates by filtration or by centrifugation.
6) Add the encapsulates in water in a weight ratio of 1:3 (particles:water) for 15 hours.
7) Dry the encapsulates by spray-drying (small particles) or by fluidized bed (previous need to separate the particles).

Example 2: Observation of Microparticle Encapsulates by Light Microscopy

Gel microparticles were stabilized with a fixation in anhydrous glutaraldehyde in methanol and embedded in Spurr resin. Thin sections (0.5 micron thickness) were stained either for protein (Light green) and polysaccharide (Ruthenium red), or with Toluidine blue (general staining). Microscope Zeiss Axioplan II with digital camera Axiocam MRc5 was used. FIG. 1 shows the protein gelled dispersed phase (A) and the polysaccharide gelled continuous phase (B).

Example 3: Iron Labelling in Microparticle Encapsulates

Figure 2:
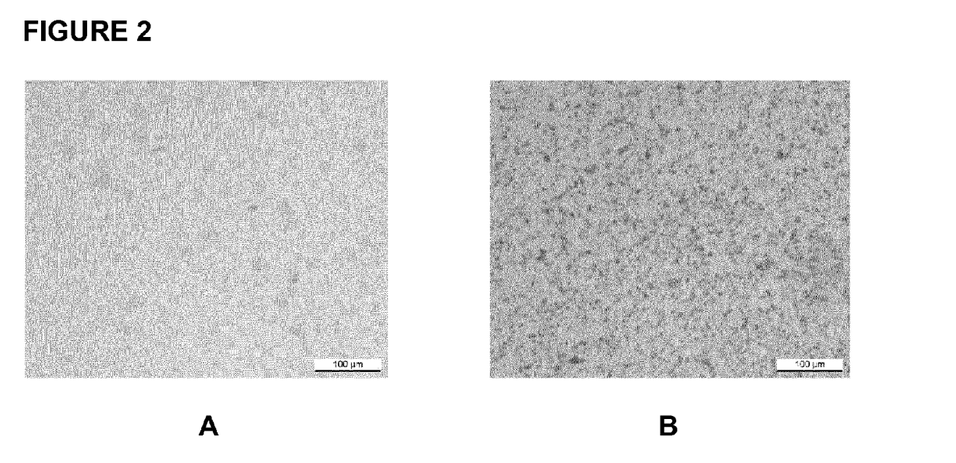
FIG. 2 shows water-in-water emulsion of Example 1. A: control without staining (after step 2 of Example 1); B: labelling of iron (after step 3 of Example 1). Scale bar represents 100 microns.

A mixture of biopolymer-iron solution, before the dripping step, is stained with alzinrarot, then put on glass slides and covered with cover slides. The sample is then observed under bright field mode in a Leica DMR microscope coupled with a camera DC 300F. FIG. 2 shows a control without staining with protein droplets dispersed in the polysaccharide continuous phase (A), and a labelled sample showing that iron is localized in the gelled protein dispersed phase (B).

Example 4: Iron Controlled Release from Microparticle Encapsulates in Sweetened Condensed Milk (SCM) Over Shelf-Life at Different Temperatures Microparticles prepared as described in example 1 were added to sweetened condensed milk (SCM) before the heat treatment step (95° C./5 s). Samples of SCM were stored in glass jars in dark room at several temperatures (4° C. [square], 20° C. [circle] and 30° C. [triangle]). The iron release from the particles in the SCM matrix was evaluated over shelf-life (1, 3, 6, 9 and 12 months). The procedure was the following:
1) Separate the encapsulates by filtration
2) Wash the encapsulates in flowing water
3) Dry the encapsulates in the oven 80° C. until constant weight
4) Measure the iron content in the dried encapsulates by Inductively Coupled
Plasma Atomic Emission Spectroscopy (ICP-AES) using a Spectro Giros Vision (Spectro Analytical Instruments GmbH, Germany)

Figure 3:
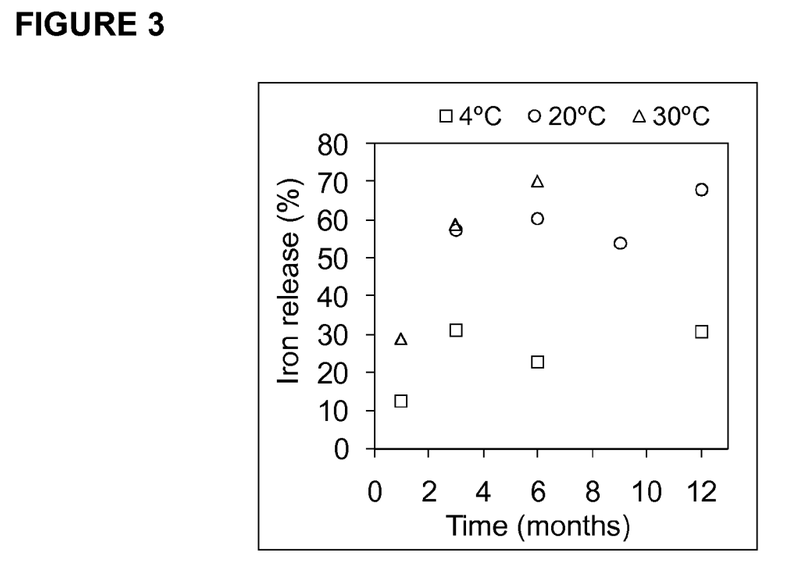
FIG. 3 shows evolution of iron leakage from gel microparticles of Example 1, over 12 months storage, at 4° C., 20° C. and 30° C.

FIG. 3 shows that at 4° C. after 1 month less than 15% of iron was released in the food matrix. At 2 months shelf-life a maximum iron release of 30% into the SCM matrix was observed. The samples stored at 20° C. and 30° C. showed an increased iron leakage over time reaching a maximum release of 70%. At ambient temperature the capsules started to disintegrate after 6 months (30° C.) or 12 months (20° C.) shelf-life due to an effect of the high sucrose content of the product. This could have enhanced the iron release.

Hence, an embodiment of the invention is an iron encapsulate comprising gelled protein microparticles which exhibit iron leakage of less than 30% at 4° C., for a storage time of 1 month, or of 2 months, or of 6 months, or of 12 months, in sweetened condensed milk and similar high sugar concentration food products.

Example 5: Iron Controlled Release from Microparticle Encapsulates in Acidified Milk Over Shelf-Life at 8° C.

Iron release in acidified milk was evaluated over 10 days at 8° C. Microparticles prepared as described in example 1 and added at two different process steps of the preparation of the chilled dairy product. Microparticles were added either to skim milk before the heat treatment step (92° C./6 min) or directly to the stirred acidified milk after pH had reached equilibrium (pH 4.5). Samples of yoghurt were stored in glass jars in dark room at 8° C. The iron release from the particles in the yoghurt matrix was evaluated during 10 days.
Procedure 1:
1) Put 70 g of skimmed milk in glass jars and add the gel microparticles (2.1 mg Fe/100 g milk)
2) Perform a heat treatment of the mixture at 92° C./6 min and cool down to 40° C.
3) Add 1.2% glucono-delta-lactone and store the samples at 4° C.
4) After 1 and 10 days stir the yoghurt and centrifuge at 100×g for 1 min.
5) Take a sample of the yoghurt without microparticles and measure the iron content by Inductively Coupled Plasma Atomic Emission Spectroscopy (ICP-AES) using a Spectro Giros Vision (Spectro Analytical Instruments GmbH, Germany).

Procedure 2:
1) Perform a heat treatment of skim milk at 92° C./6 min and cool down to 40° C.
2) Add 1.2% glucono-delta-lactone at 40° C. and store the samples at 4° C.
3) After 15 h at 4° C. stir the acidified milk and add the gel microparticles (2.1 mg Fe/100 g product)
4) After 1 and 10 days centrifuge the acidified milk at 100×g for 1 min.
5) Take a sample of the yoghurt without microparticles and measure the iron content by Inductively Coupled Plasma Atomic Emission Spectroscopy (ICP-AES) using a Spectro Ciros Vision (Spectro Analytical Instruments GmbH, Germany).

Figure 4:
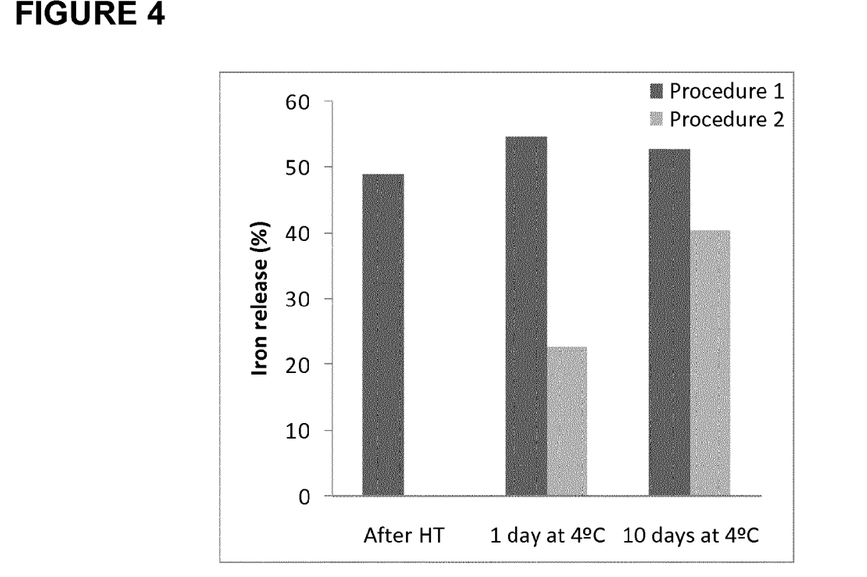
FIG. 4 shows iron release into an acidified milk matrix after heat treatment and over time at 4° C.

FIG. 4 shows that up to 50% of iron was released in the milk after heat treatment process. Overtime the maximum release observed was 55%, which happened already after 1 day storage at 4° C. On the other hand, iron release increased over time when the gel microparticles were added into the acidified milk (Procedure 2). After 10 days storage about 40% of the iron was released in the yoghurt matrix.

Example 6: Iron Release from Microparticle Encapsulates in Simulated Gastric Juice (SGJ)

The iron release from gel microparticles in simulated gastric juice was evaluated over 5 hours. The procedure of the experiment was the following:
1) Weight 1 g of dried gel microparticles and add 3 g of water for hydrating the gel
2) Prepare the gastric juice simulate according to the following steps:
   a. Solution 1—Dissolve 0.6 g pepsin, 1 g NaCl, 5.2 g glucose in 200 mL water adjusting the final pH to 2.
   b. Solution 2—prepare a 0.5% NaCl aqueous solution c. Mix 77% of solution 1 with 23% of solution 2.
3) Add 96 g of simulated gastric juice at 37° C. to the hydrated gel microparticles and keep stirring for 5 h.
4) After 0.5, 1, 3 and 5 h take one aliquote of the gastric juice simulate without particles and analyse the iron content by Inductively Coupled Plasma Atomic Emission Spectroscopy (ICP-AES) using a Spectro Ciros Vision (Spectro Analytical Instruments GmbH, Germany).

Table 1 shows that iron released from the gel microparticles in SGJ at 37° C. Up to 5 h the bioaccessibility of iron was almost 60%.

TABLE 1

| Bioaccessibility of iron in SGF at 37° C. | |
| --- | --- |
| Time (h) | Iron released % |
| 0.5 | 30.4 |
| 1 | 38.9 |
| 3 | 45.7 |
| 5 | 56.7 |

In the context of the specification, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention.

It will be understood that the materials used and the chemical details may be slightly different or modified from the descriptions herein without departing from the methods and compositions disclosed and taught by the present invention.

Although preferred embodiments have been described in the foregoing description, it will be understood that the invention is not limited to the specific embodiments disclosed. Various modifications may become apparent to those of ordinary skill in the art and may be acquired from practice of the invention. Individual features mentioned in different claims, may possibly be combined advantageously, and mention of these features in different claims does not exclude that a combination of features is not possible and advantageous.

Example 7: Preparation of Molecular Complex Encapsulates with Whey Protein Isolate and Acacia Gum Final composition of encapsulates (before drying): 3.7 wt % WPI/2.8 wt % acacia gum/0.016 wt % Fe
WPI: whey protein isolate
Description of the process steps:
1) Mix and hydrate 4 wt % WPI powder in water
2) Add 0.09 wt % of $FeSO_4.7H_2O$ powder and adjust the solution pH to 6.5
3) Denature the WPI-iron mixture at pH 6.5 at 85° C. during 15 min
4) Add acacia gum powder to reach 2.8 wt %, the final pH value is between 5.5 and 6.0.
5) Optionally add vegetable juice concentrate to reach 4.6% final concentration, adjusting continuously the pH to 5.0 with 2M NaOH (about 0.7 wt % of total mixture)
6) Spray-dry the mixture.

Figure 5:
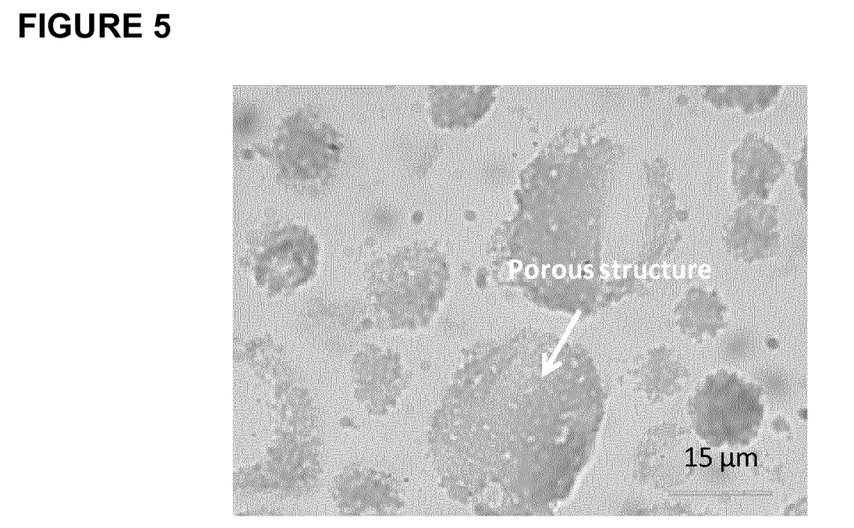
FIG. 5 shows the porous structure of molecular complexes encapsulates prepared according to Example 7 (light microscopy). Scale bar represents 15 microns.
Figure 6:
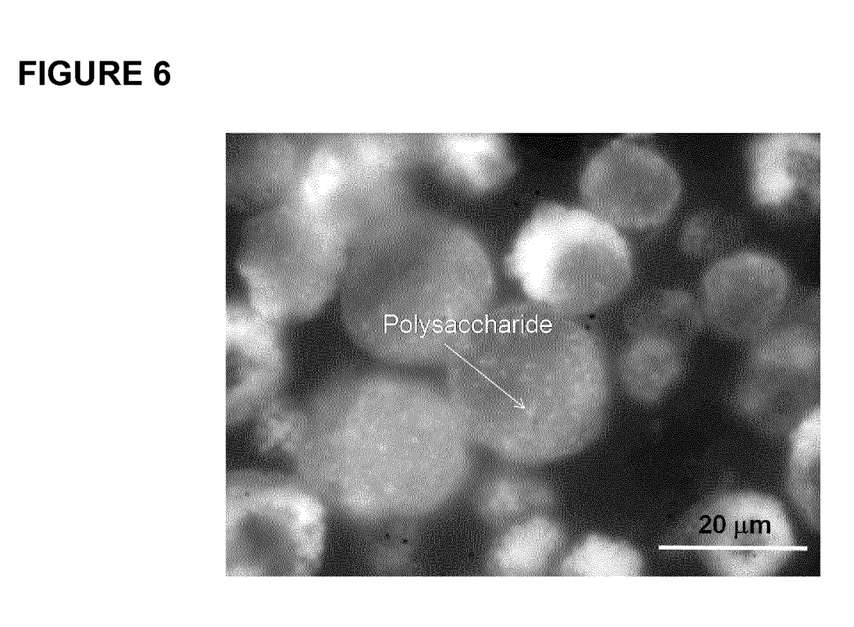
FIG. 6 shows the polysaccharide labelling of molecular complexes encapsulates prepared according to Example 7 (light microscopy). Scale bar represents 20 microns.

Observation by light microscopy (FIGS. 5 and 6)

The Acacia gum was labelled using a FITC (fluorescein isothiocynate) lectin (Bandeiraea simplicifolia, Sigma, #9381) at a concentration of 50 µg/mL in PBS pH 7.2 for 2 hours. They were observed by epifluorescence with the Polyvar microscope (Excitation: 488 nm; Emission: >505 nm).

Figure 7:
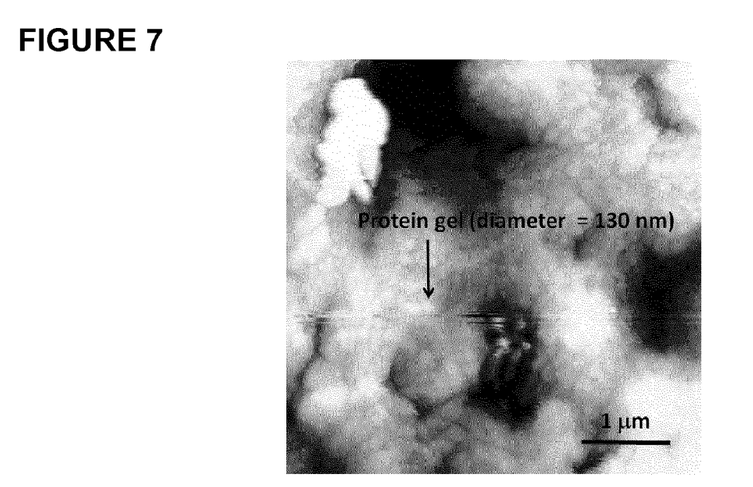
FIG. 7 shows the structure of molecular complexes prepared according to Example 7, by atomic force microscopy. Scale bar represents 1 micron.

Observation by atomic force microscopy (AFM) (FIG. 7)

The glass slides with the sections were attached to a magnetic plate and put onto the magnetic sample holder of the AFM (PSIA, XE-100). Images were acquired in the intermittent contact mode (tapping mode) at a rate ranging from 1 to 2.5 Hz using SSS-NCLR (Nanosensors) tips (Thickness 7+/−1 µm. Length 225+/−10 µm, Width: 28+/−7.5 µm, Resonance Frequency: 146-236 kHz, Force constant 20-98 N/m, Tip height 10-15 µm, Tip radius: 2 nm).

Figure 8:
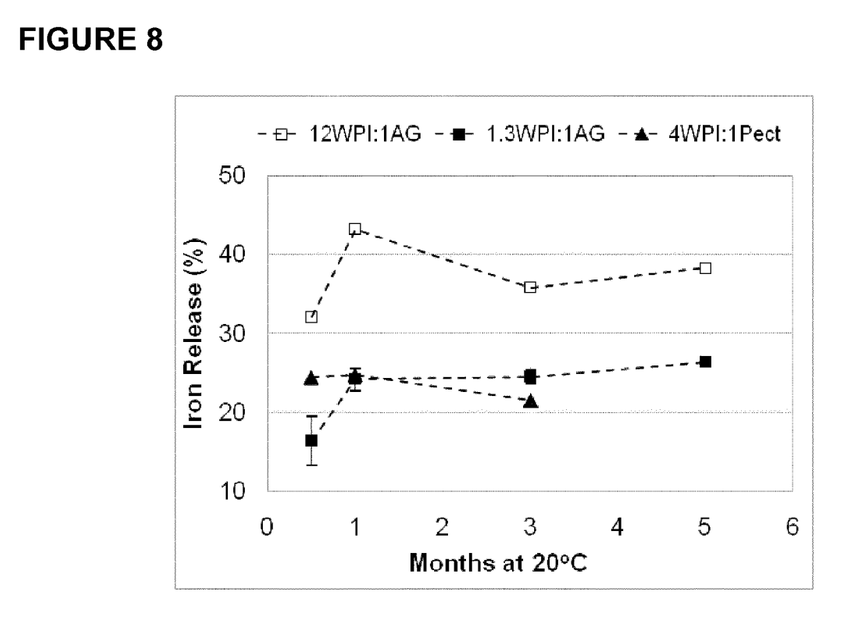
FIG. 8 shows iron release into a sweetened condensed milk matrix over time at 4° C., from Example 7.

As can be seen from FIGS. 7 and 8, protein gels of about 130 nm diameter are bridged together by Acacia gum, to form secondary molecular complexes of between 200 nm to 100 microns diameter.

Example 8: Iron Controlled Release from Molecular Complex Encapsulates in Sweetened Condensed Milk (SCM) Over Shelf-Life at 20° C.

Molecular complex encapsulates prepared as described in Example 7, with vegetable juice, were added to sweetened condensed milk (SCM) before the heat treatment step (95° C./5 s). The mix was then heat treated at 95° C. during 5 seconds. Samples of SCM were stored in glass jars in dark room at 20° C. The iron release from the particles in the SCM matrix was evaluated over shelf-life (0.5, 1, 3, 5 months). The procedure was the following:
1. Dilute each SCM sample half in pure water in order to decrease the viscosity of the solution (5 g in 10 g total);
2. 1 ml of solution is carefully poured inside a dialysis bag Spectra/Por® Dialysis Membrane (SpectrumLabs Inc, USA) with a molecular weight cut-off of 2000 Da;
3. Dialyse the sample for 2 h in an external medium containing 50 g of water+0.1156 mg sodium citrate+14.93 g sugar (23% solution) at pH 7.00;
4. After 2 h, withdraw the content of the bag in an Eppendorf tube;
5. Measure the iron content of the sample in the Eppendorf tube by Inductively Coupled Plasma Atomic Emission Spectroscopy (ICP-AES) using a Spectro Giros Vision (Spectro Analytical Instruments GmbH, Germany).

FIG. 8 shows that the amount of polysaccharide in the molecular complex can influence the iron release in the food matrix. The increase of acacia gum (AG) content caused a decrease of iron leakage from about 40% to less then 30% all over time (sample with weight ratio 12WPI:1AG compared to the ratio 1.3WPI:1AG). The type of polysaccharide present in the encapsulate also have an impact on iron release. By using 3 times less pectin than acacia gum (weight ratio), it is possible to get very similar values of iron release in SCM. In addition, the iron leakage occurs mainly during the heat treatment step of the SCM process. At 5 months, there is nearly no increment on iron release as compared to the beginning of the shelf-life.

The invention claimed is:

1. A food-grade encapsulate comprising gelled protein aggregates embedded in a continuous polysaccharide phase, the gelled protein aggregates comprise a protein and a dietary mineral comprising iron, the iron is selected from the group consisting of $Fe^{2+}$, $Fe^{3+}$, and mixtures thereof and is present in a salt comprising an anion selected from the group consisting of chloride, phosphate, and sulphate, the protein is selected from the group consisting of micellar caseins, acid caseins, caseinates, and mixtures thereof, and the food-grade encapsulate has a size of from 1 micron to 5 mm.

2. The food-grade encapsulate according to claim 1, wherein the dietary mineral is provided as a food-grade mineral, organic salt, or ions.

3. The food-grade encapsulate according to claim 1, wherein the polysaccharide component is selected from the group consisting of highly branched pectins, arabinogalactans, arabinogalactan-protein complexes, cereal arabinoxylans, high molecular weight polysaccharides, gelling polysaccharides and mixtures thereof.

4. The food-grade encapsulate according to claim 1, which has a pH ranging from 3.5 to 7.0.

5. The food-grade encapsulate according to claim 1, which is in the form of a powder.

6. The food-grade encapsulate of claim 1, wherein the food-grade encapsulate consists of the polysaccharide component, the dietary mineral, and the protein selected from the group consisting of micellar caseins, acid caseins, caseinates, and mixtures thereof.

7. A process for producing a food-grade encapsulate, comprising the steps of:
a) mixing a micronutrient with a protein solution, the micronutrient is a dietary mineral comprising iron, and the iron is selected from the group consisting of $Fe^{2+}$, $Fe^{3+}$, and mixtures thereof and is present in a salt comprising an anion selected from the group consisting of chloride, phosphate, and sulphate, and the protein is selected from the group consisting of micellar caseins, acid caseins, caseinates, and mixtures thereof;

b) gelling the protein solution;

c) before or after step b), adding a polysaccharide component to the protein solution; and d) transferring the gelled protein solution into an ionic solution comprising cations selected from the group consisting of calcium, zinc and potassium.

8. The process according to claim 7, wherein step b) comprises at least one step selected from the group consisting of:

heating the protein solution to a temperature from 70° C. to 150° C., for a period of from 10 seconds to 2 hours, at a pH from 5.8 to 8.0, until gelification of the protein;

adjusting the pH of the protein solution to the isoelectric point of the protein; and treating the protein solution under high-pressure from 200 MPa to 800 MPa at a temperature from 20° C. to 100° C., for a period of from 10 seconds to 2 hours, at a pH from 5.8 to 8.0, until gelation of the protein, wherein the protein solution has a concentration of 1 to 10% by weight of the protein.

9. The process according to claim 7, comprising a step of acidification of the protein solution.

10. The process according to claim 7, comprising a final step of drying after steps a), b), c) and d).

11. The process of claim 7, comprising:

preparing a first solution comprising the protein;

admixing a second solution comprising iron in ferrous form and having a pH from 6 to 7 into the first solution under stirring to form a third solution that is the protein solution;

admixing a fourth solution comprising a polysaccharide selected from alginate, carrageenans, pectins, and agar under stirring into the third solution to form a fifth solution; and adjusting the pH of the fifth solution to a value between 1 pH unit above and 1 pH below the isoelectric point of the protein to form the gelled solution.

12. The process of claim 11, wherein the protein solution comprises 1 to 10 wt % casein.

13. The process of claim 7, wherein the food-grade encapsulate consists of the polysaccharide component, the dietary mineral, and the protein selected from the group consisting of micellar caseins, acid caseins, caseinates, and mixtures thereof.

14. A food product comprising a food-grade encapsulate comprising gelled protein aggregates embedded in a continuous polysaccharide phase, the gelled protein aggregates comprise a protein and a dietary mineral comprising iron, the iron is selected from the group consisting of $Fe^{2+}$, $Fe^{3+}$, and mixtures thereof and is present in a salt comprising an anion selected from the group consisting of chloride, phosphate, and sulphate, the protein is selected from the group consisting of micellar caseins, acid caseins, caseinates, and mixtures thereof, and the food-grade encapsulate has a size of from 1 micron to 5 mm.

* * * * *